Dec. 27, 1938.  C. C. WHITTAKER  2,141,259
CONTROL APPARATUS
Filed Dec. 31, 1936  2 Sheets-Sheet 1
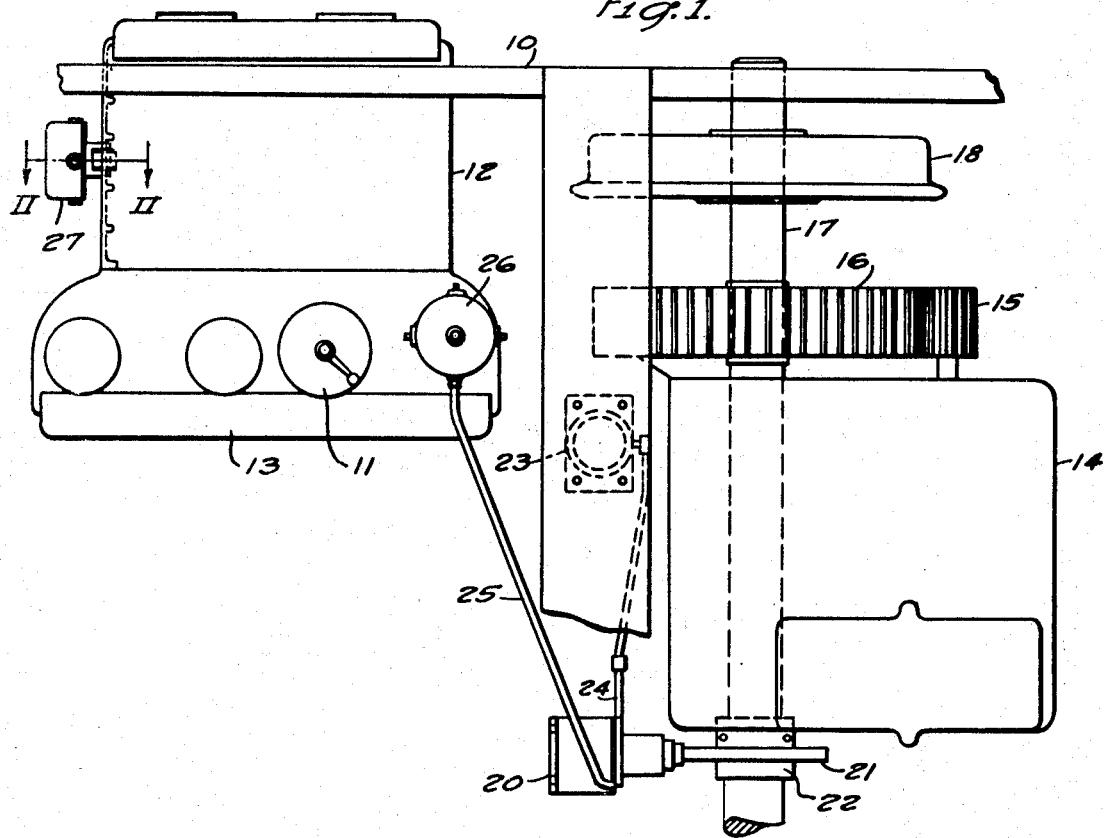
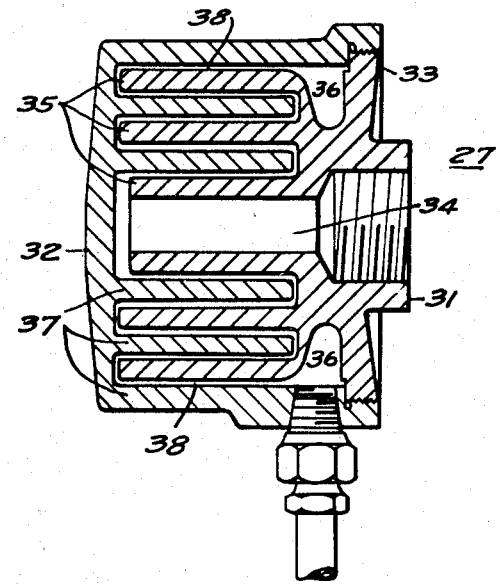
WITNESSES:
INVENTOR
Charles C. Whittaker
BY
Ezra W. Savage
ATTORNEY Dec. 27, 1938.   C. C. WHITTAKER   2,141,259
CONTROL APPARATUS
Filed Dec. 31, 1936   2 Sheets-Sheet 2

WITNESSES:

INVENTOR
Charles C. Whittaker.
BY
ATTORNEY

Patented Dec. 27, 1938

2,141,259

UNITED STATES PATENT OFFICE 2,141,259

CONTROL APPARATUS

Charles C. Whittaker, Pittsburgh, Pa., assignor to Westinghouse Electric & Manufacturing Company, East Pittsburgh, Pa., a corporation of Pennsylvania Application December 31, 1936, Serial No. 118,576

9 Claims. (Cl. 200—168)

My invention refers, generally, to control apparatus, and has reference in particular to control apparatus of the enclosed type.

Often it is desirable to provide electric control apparatus with moisture-proof or explosion-proof enclosures. Particularly is this so where circuit breaking devices are used in connection with the control apparatus, in locations such as around mines, flour mills, or grain elevators, where the surrounding atmosphere comprises an explosive mixture. Safety regulations require that circuit breaking devices in such locations be enclosed in casings not only strong enough to withstand any explosion within the casing, but also tight enough to prevent ignition of the surrounding explosive atmosphere by any internal ignition of gases from arcing of the circuit breaking device.

It has been found through operation of circuit breaking devices which are so enclosed, that there is a marked increase in the wear of the contact members and deterioration of insulation over that of similar control in other locations, where it is not required to be enclosed. This has been proved to be caused largely by the formation of nitric and nitrous acids within the casing. Repeated openings of the circuit breaking device cause formation, through the heat of the arcs drawn upon opening of the contact members, of nitric and nitrous oxides, which combine with the oxygen and moisture within the casing, to form nitric and nitrous acids. These acids are extremely active and readily corrode metallic parts and destroy the insulation of the control apparatus. Such corrosion so roughens the surfaces of the contact members that they do not readily make good contact, and upon repeated operation of the contacting device, the surface of the contact members further pits and burns greatly shortening the duration of their useful life. The destruction of the insulation eventually results in an electrical failure of the control, not only rendering it useless, but most likely causing damage to the motor, and hazarding the safety of the operator and other workers.

It is, therefore, generally an object of my invention to prevent undue corrosion of the contact members and excessive deterioration of the insulation in enclosed control apparatus by providing for the removal from the enclosure of harmful gases.

Another object of my invention is to prevent the formation of corrosive acids within the enclosure of a control casing by removal of the gases formed therein.

Still another object of my invention is to provide a ventilating system for an explosion-proof electric control enclosure.

A further object of my invention is to provide for automatically removing harmful gases from the enclosure of control apparatus for electrically powered equipment, upon operation of the equipment.

A still further object of my invention is to provide for removal of gases formed within an explosion-proof control enclosure on a vehicle by a ventilating system dependent upon motion of the vehicle for its operation.

A yet further object of my invention is to provide a ventilating system for an explosion-proof electric control enclosure which is simple and easy to manufacture, readily installed, and economically maintained.

Other objects will, in part, be obvious and, in part, appear hereinafter.

For a more complete understanding of the nature and scope of my invention, reference may be had to the following detailed description taken in connection with the accompanying drawings, in which:

Figure 1 is a diagrammatic view of an application embodying the principal features of my invention;

Fig. 2 is an enlarged sectional side elevation view of a breather device of Fig. 1 along the lines II—II.

Figure 3:
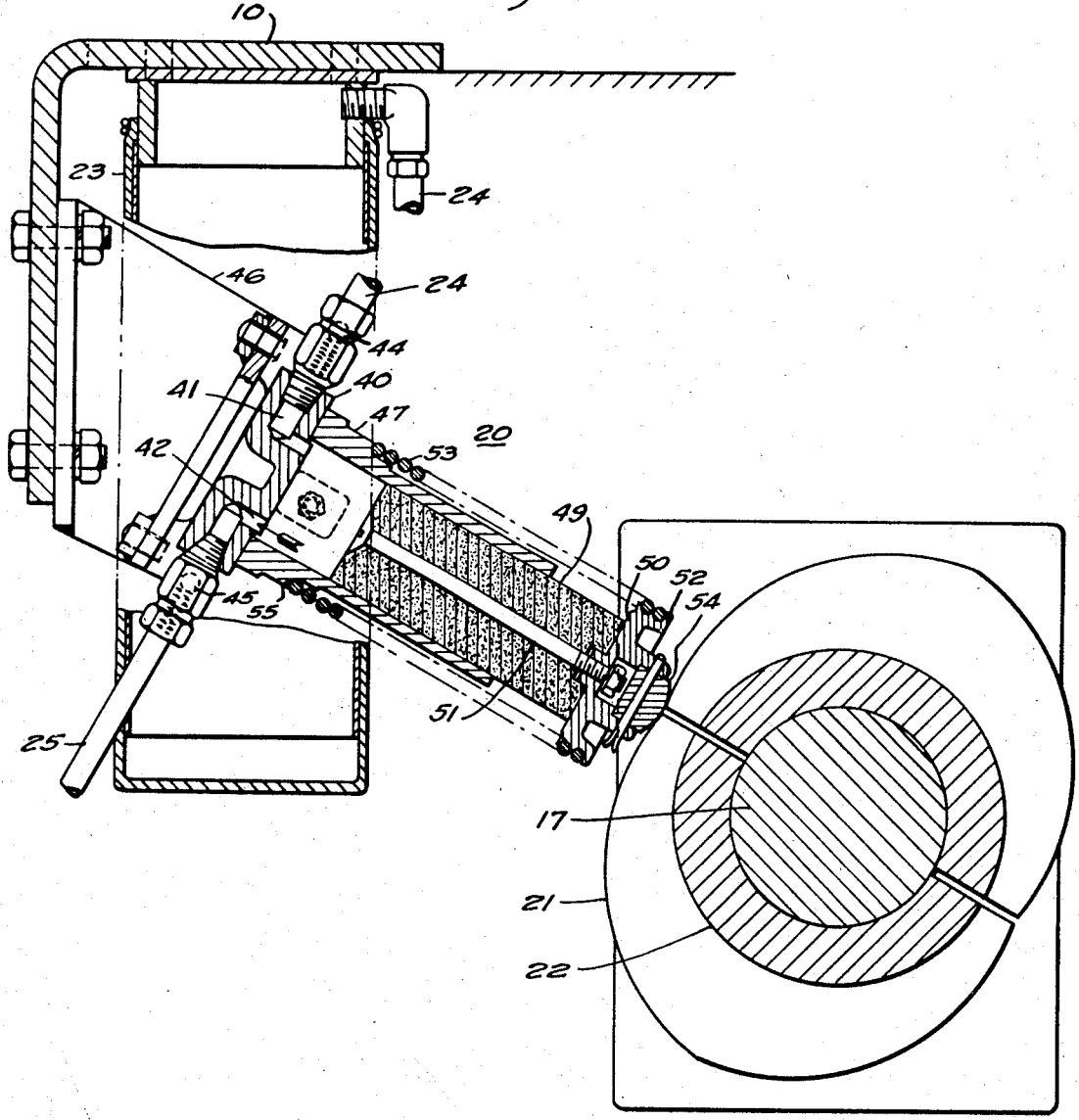
Fig. 3 is a sectional side elevation view of one form of compressor device which may be used in my invention.

My invention consists, generally, in providing a ventilating system, including a compressor device and an explosion-proof labyrinth breather device, for effecting the removal of harmful gases formed within the enclosure of control apparatus of any electrically operated machine. While my invention may be applied to ventilate the control enclosure of any description of electrically powered machinery, I prefer to describe a particular application, in connection with the ventilation of enclosed control apparatus on a mining locomotive. While it is to be understood that any compressor device used in connection with such ventilating system may be driven by a separate motor, by the operation of the control device itself, or by any motion incident to the operation of the machine, I have in this instance, preferred to operate the compressor device through a cam mechanism from a driving shaft on the locomotive. It has been found desirable, owing particularly to the lack of space on such a locomotive, to avoid the use of a separate driving motor which must itself be totally enclosed in an explosion-proof frame. The mounting of the compressor adjacent to the axle of the locomotive, and driving it therefrom, has been found to make the installation particularly simple, by providing automatic means for operating the compressor only when the locomotive is in use, and requiring a minimum of alterations to adapt the unit to existing locomotives.

Referring particularly to Fig. 1 of the drawings, the reference numeral 10 designates, generally, the frame of a mining locomotive of the explosion-proof type. The control contactors used in connection with the manual controller 11 may be enclosed within the explosion proof enclosure 12 which is adapted to be secured in fixed relation with the explosion-proof enclosure 13 of the controller. This unitary arrangement may be located on the driving platform of the locomotive within the frame 10, where it is accessible to the operator. In order to drive the locomotive, a traction motor 14, controlled by manipulation of the controller 11, is connected to the driving wheels 18 through the pinion 15, spur gear 16 and axle 17, in a well known manner.

A compressor device 20, which may be actuated by a cam 21 mounted on the axle 17 by means of a split collar 22, is disposed to draw a supply of the surrounding air through a filter device 23, by way of pipe line 24, and furnish it to the intake breather 26 of the control enclosure, through a pipe line 25. By thus supplying filtered air to the breather device 26, the pressure within the contactor casing 12 and controller casing 13 which are secured in fixed relation to each other, is raised above that of the surrounding atmosphere, and gases formed within the casings 12 and 13 are exhausted through the exhaust breather 27, thus preventing the formation of corrosive acids within the casings through repeated arcing of the control contactors.

A better understanding of the labyrinth type breather device, such as used for the intake breather 26 and exhaust breather 27, may be obtained by reference to Fig. 2 of the drawings, from which it may be seen that the breather device 27 comprises a pair of related body members 31 and 32. The base body member 31 may comprise a peripherally threaded disc 33 having a central opening 34 therethrough, and a plurality of upstanding concentric flanges 35 on one face, with a peripheral groove 36 adjacent the base of the outermost concentric flange 35. The cap body member 32, comprising generally, a cup-shaped body internally threaded at the rim is adapted to engage the peripherally threaded disc 33 of the base member to provide a unitary assembly. A plurality of upstanding concentric flanges 37, within the cap body member 32 are disposed to closely interrelate with the flanges 35 of the base member 31 to provide a series of restricted annular passages 38, between the flanges 35 and 37, from the central opening 34 to the peripheral groove 36 which is disposed to provide a connecting passage to an opening 39 in the cap body member 32 wherein a nipple or other pipe connecting means may be secured.

Such a breather device may be connected to a ventilation port in a control casing, and through the restricted passageways 38 provides for ventilation of an explosion-proof control enclosure by permitting the passage of gases therethrough, yet providing restriction enough and cooling surface sufficient to cool any gases, heated by an explosion within the casing, below the ignition point before they come in contact with any surrounding explosive mixture. By so cooling the heated gases ignition of such surrounding mixture is prevented.

Referring to Fig. 3 of the drawings, which shows a sectional side view of a preferred form of compressor device used in my invention, the reference numeral 20 designates, generally, the compressor device, which in this instance, is disposed to be actuated by the cam 21, mounted on the driving shaft 17 by means of a split collar 22.

The compressor device or pump 20 may comprise a base member 40 provided with an inlet port 41 and an outlet port 42 having ball type check valves 44 and 45, respectively, to permit passage of air or gases through the compressor 20 in one direction only. To the base member 40, which may be secured in any desired manner to the frame 10 of the locomotive, such as by means of a bracket 46, a cylinder member 47 is secured. A piston member 49 which, in this instance may comprise a block of graphite which is self-lubricating, is disposed to be secured to a piston cap member 50 by means of a centrally located bolt 51, and movably positioned within the cylinder 47. To actuate the piston member 49 on the intake stroke and maintain the friction button 54 of the cap member 50 in engagement with the surface of the cam 21, a grooved rim 52 of the cap member 50 is disposed to maintain engagement with a helical spring member 53 which abuts a shoulder 55 on the base member 47.

The spring member 53 will therefore be compressed on the compression stroke of the piston member 49, and will actuate the piston on the intake stroke.

The inlet opening 41 of the compressor device may be connected by means of a pipe line 24 to the filter 23 to prevent the entrance of particles of grit and dust into the ventilating system. The supply line 25 provides for passage of filtered gases from the compressor 20 to the intake breather 26 of the control enclosure.

As the locomotive moves, the cam 21 will revolve and due to its eccentricity, will impart a reciprocal motion to the piston 49, drawing in gases from the surrounding atmosphere through the filter 23 and supplying filtered gases to the intake breather 26. By forcing a supply of filtered gases through the intake breather 26, any undesirable gases formed within the controller box 13 or contactor box 12, by arcing of the contact members, will be forced out through the exhaust breather 27. Even should an explosive mixture of gases be forced into the control casing, any internal explosion is prevented from spreading to the surrounding gases, as the hot gases within will be restricted in their passage through the breathers, and cooled below the ignition point before coming in contact with the surrounding gases. While the apparatus is in operation, the increased pressure within the casing, due to the supply of filtered gases from the compressor 20, will continually force any nitric or nitrous oxides out of the exhaust breather.

The compressor 20 therefore operates only when the locomotive is moving and thus there can be no energy loss through failure to shut off a compressor motor while the locomotive is idle. It may be seen that the compressor might similarly be connected to operate from manipulation of the controller itself, or through any motion incident to the operation of any machine with which the control might be used.

It may, therefore, be seen from the foregoing description that by my invention I have provided means for the removal of the harmful gases from a completely enclosed control casing, thereby preventing the formation of corrosive acids within the casing. This increases greatly the life of the contact members, other metallic parts and also the insulation of such enclosed control, and has obviated one of the most highly undesirable disadvantages of totally enclosed control apparatus. My invention is easy to construct and simple to operate, and may be readily applied to existing apparatus with a minimum of alteration. It is automatic in operation and requires little or no maintenance.

Since certain changes may be made in the above description, and different embodiments of the invention may be made without departing from the spirit thereof, it is intended that all matter contained in the above description or shown in the accompanying drawings shall be taken in a descriptive and not in a limiting sense.

I claim as my invention:

1. In a power driven machine, the combination of control apparatus including circuit interrupting means, an enclosure for the interrupting means having restricted breather ports in the walls thereof, and compressor means associated with one of said breather ports operable independently of the opening of the interrupting means to remove from the enclosure gases formed by operation of the circuit interrupting means.

2. The combination in explosion-proof electric control apparatus, of an electric contactor device, a casing enclosing said contactor device, and compressor means including a restrictive labyrinth passage in the wall of the casing adapted to secure ventilation of said casing by providing for a flow of gases therethrough independently of the opening of the contactor device.

3. In control apparatus for a power-driven machine, the combination of electric circuit interrupting means, an explosion-proof enclosure for the interrupting means, restricted labyrinth passages associated with ventilation ports in the walls of the enclosure, and compressor means associated with one of the ventilation ports operable to maintain the pressure within the enclosure above the surrounding pressure to ventilate the enclosure independently of the opening of the circuit interrupting means.

4. The combination in control apparatus, of a circuit breaking device, an explosion-proof enclosure for the circuit breaking device provided with inlet and outlet ventilating ports independent of the circuit breaking device, breather means associated with the inlet and outlet ports disposed to permit a restricted flow of gases therethrough, and means associated with the inlet port operable to maintain the pressure within the enclosure above the surrounding pressure and secure removal through the outlet port of gases formed within the enclosure by operation of the circuit breaking device, independently of the opening of the circuit breaking device.

5. The combination in a power-driven machine, of electric control apparatus for the machine including a circuit interrupting device, an explosion-proof enclosure for the control apparatus provided with inlet and outlet ports independent of the circuit interrupting device, breather means associated with said ports comprising a series of restricted passageways adapted to permit a limited flow of gases therethrough, and pressure means operative from the machine and associated with one of the breather means to secure a flow of gases within the enclosure from one port to the other to remove from the enclosure gases formed by operation of the circuit interrupting device.

6. In an explosion-proof electrically-operated machine, the combination of electric control apparatus including an electric contactor device, an explosion-proof enclosure for the contactor device provided with openings in the walls thereof having a series of restricted passages to permit a limited flow of gases therethrough, and pump means associated with one of said openings operable upon operation of the machine to exhaust gases formed within the enclosure from another opening.

7. The combination in an explosion-proof electric mine locomotive, having a frame with wheels and axles, of an electric driving motor, control apparatus for said motor including an electric circuit breaking device, an explosion-proof enclosure for the control apparatus provided with inlet and outlet breather ports independent of the circuit breaking device adapted to permit a restricted flow of gases through an extensive path of small clearance, compressor means associated with said inlet breather port operable to increase the pressure within the enclosure and remove gases formed by operation of the control apparatus through the outlet breather port without igniting any inflammable gases exterior to the enclosure, and means associated with the locomotive axle to secure operation of the compressor means while the locomotive is in operation.

8. The combination in an explosion-proof electric mine locomotive, having a frame with wheels and axles, of an electric driving motor, control equipment for the motor including an electric contactor device, an enclosure for the control equipment having inlet and outlet ventilating ports independent of the contactor device, breather devices associated with the ventilating ports disposed to permit a restricted flow of gases therethrough and to cool any gases ignited within the closure below the ignition temperature during the passage therethrough, compressor means associated with the inlet ventilating port operable to secure an inflow of gas through the inlet ventilating port and exhaust any gases formed within the closure by operation of the contactor through the outlet ventilating port, and cam means associated with the locomotive axle for operating said compressor means.

9. The combination in a power-driven vehicle having an electric driving motor and control means for the driving motor, of an enclosure for the control means having continually open restricted ventilating ports in the walls thereof adapted to prevent ignition of any exterior gases by arcing of the control means, compressor means associated with one of said ventilating ports for providing a flow of gases throughout the enclosure to exhaust any gases formed by arcing of the control means through another of said ventilating ports, and means for operating the compressor means.

CHARLES C. WHITTAKER.